United States Patent [19]

Natarajan

[11] Patent Number: 4,937,856
[45] Date of Patent: Jun. 26, 1990

[54] DIGITAL VOICE CONFERENCING BRIDGE

[76] Inventor: T. Raj Natarajan, 3516 Cromwell St., Plano, Collin County, Tex. 75075

[21] Appl. No.: 57,091

[22] Filed: Jun. 1, 1987

[51] Int. Cl.$^5$ ........................ H04M 3/56; H04M 1/58
[52] U.S. Cl. .................................... 379/158; 379/202; 379/205; 379/206; 370/62
[58] Field of Search ............... 379/158, 202, 203, 204, 379/205, 158, 202-206; 370/62

[56] References Cited

U.S. PATENT DOCUMENTS

| | | | |
|---|---|---|---|
| 3,970,797 | 7/1976 | Johnson et al. | 370/62 |
| 4,139,731 | 2/1979 | Hashemi et al. | 379/202 |
| 4,541,087 | 9/1985 | Comstock | 370/62 |
| 4,611,095 | 9/1986 | LeBlanc et al. | 379/203 |

OTHER PUBLICATIONS

DSP Technology Corp, "Six Party Teleconferencing", (Reader Service Announcement), *Teleconnect,* May 1986.
A. E. Joel, Jr., "Electronic Switching:Digital Central Office Systems of the World"; IEEE Press, @ 1982, pp. 1-12.
E. A. Munther, "Digital Switch, Digital Talks", *IEEE Communications Magazine,* Nov. 1982, pp. 15-23.
K. E. Martersteck et al., "The 5ess Switching System-:Introduction", *AT&T Technical Journal,* vol. 64, No. 6, Part 2, Jul.-Aug. 1985, pp. 1305-1315.
Publication: *Telephony,* Nov. 18, 1985, p. 69.

*Primary Examiner*—Jin F. Ng
*Assistant Examiner*—Wing F. Chan

[57] ABSTRACT

A conferencing bridge provides conferencing capabilities for a plurality of input lines and for a plurality of output lines. The conferencing bridge has a signal processor which processes the audio information transferred between the input lines and the output lines. A plurality of codecs analog to digital conversion and digital to analog conversion for interfacing the signal processor to the plurality of input lines and output lines. A control processor is operatively connected to the signal processor and controls and operation of the signal processor as well as the conferencing bridge through number codes that are inputted to the conference bridge via the telephone key pad. A tone converter converts the inputted tones to digital information to which the control processor will respond. The signal processor provides not only identification of the telephone line on which a speaker is talking but also performs an amplitude adjustment so that there is a minimum loss involved for the conferencing network.

13 Claims, 12 Drawing Sheets

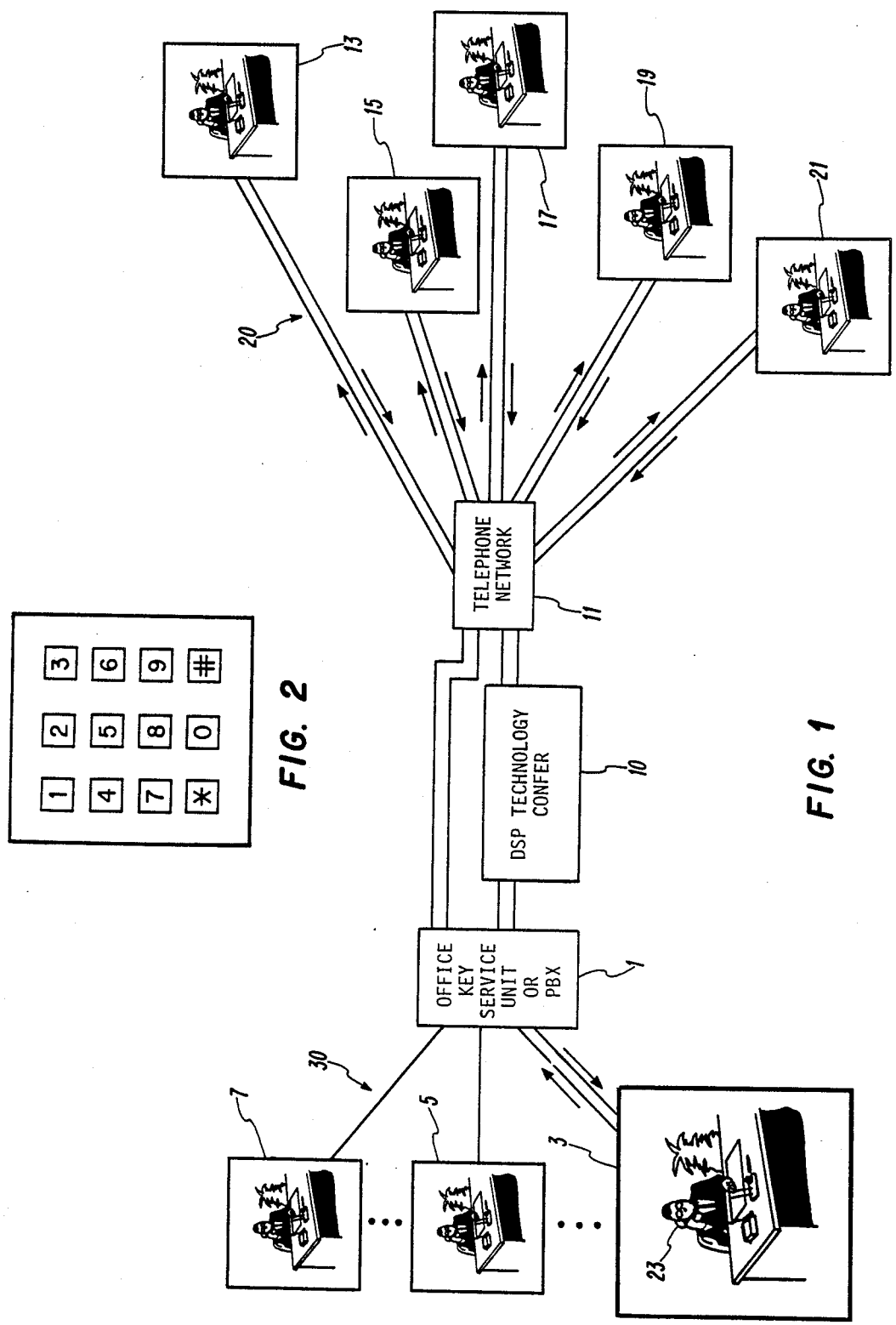

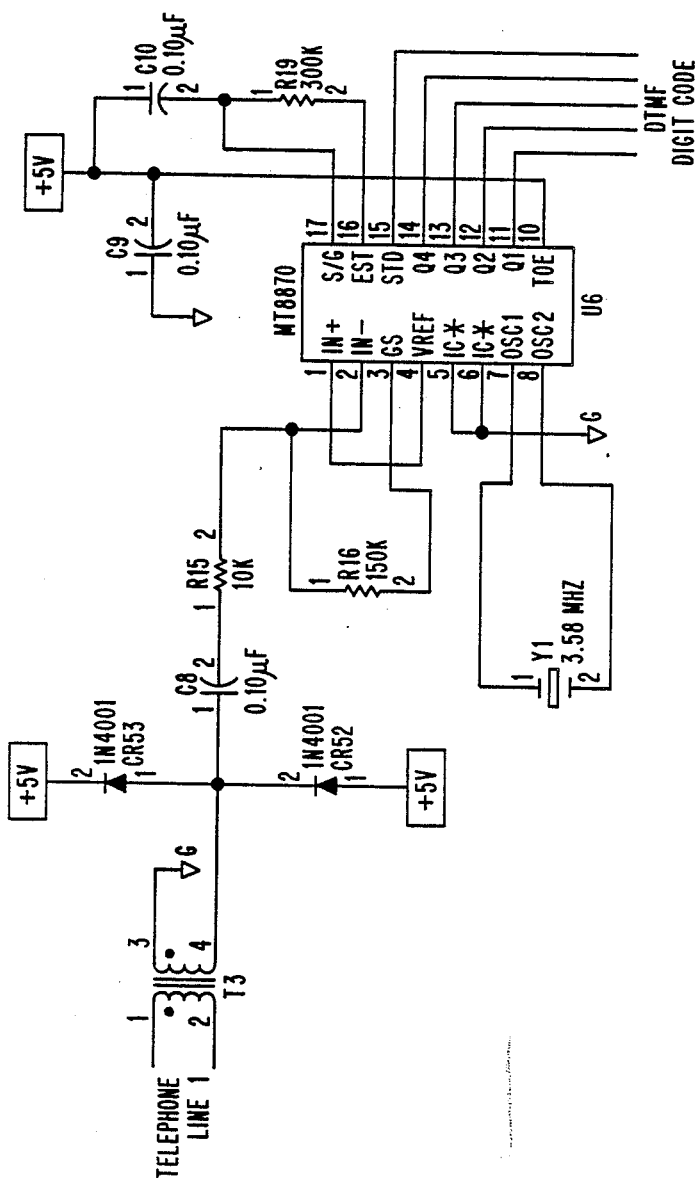
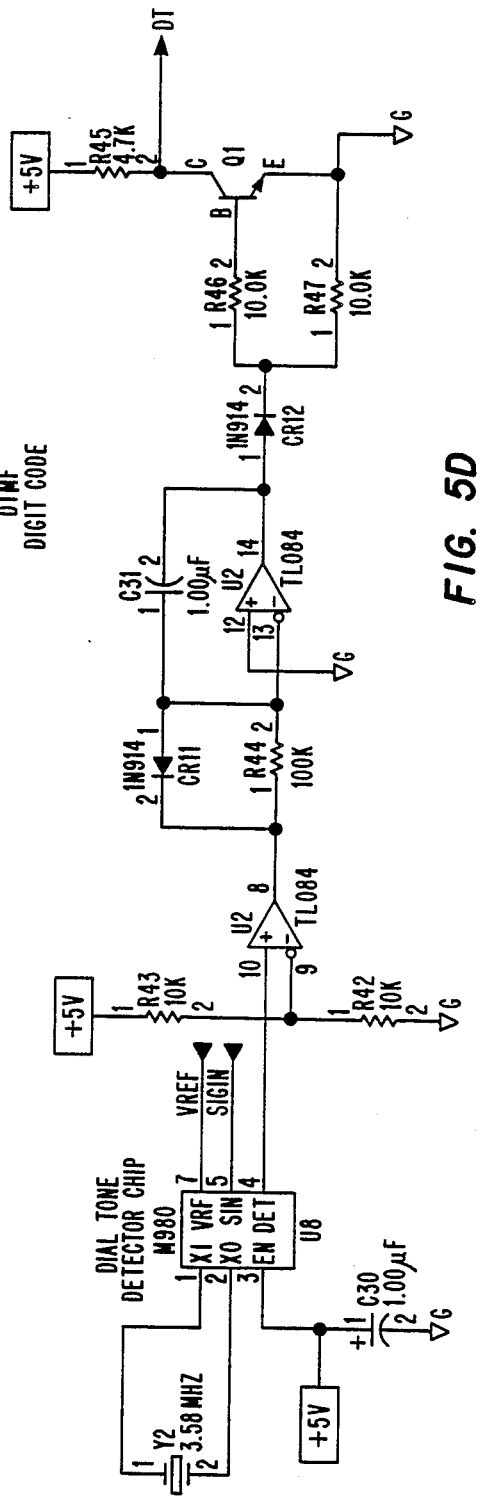
FIG. 5C
FIG. 5D

4,937,856

DIGITAL VOICE CONFERENCING BRIDGE

BACKGROUND OF THE INVENTION

This invention relates to telephony, and in particular to a voice conferencing bridge for use in a telephone system.

There have been considerable efforts in the past to develop an easy to use and install conferencing system that enables businesses to implement conferencing of parties both within their operations and outside of their operations. Some examples of conferencing networks are contained in U.S. Pat. No. 4,267,593 which is directed to a digital conferencing arrangement for use in a digital telecommunications switching system and in U.S. Pat. No. 4,661,949 which is directed to a circuit for conference telephony using a conventional system for transmission of voice data. In U.S. Pat. No. 4,267,593 a conventional hybristation is materialized by using at least two buffer memory circuits, one each provided for each of the frames and adapted to be switched to each other, one for input and the other for output, enabling one of the buffer memory circuits to memorize voice data transmitted thereto and, in the meantime permitting the voice data of the preceding frame memorized in the other buffer memory circuit to be read out, converting the voice data read out into an analog signal, and then synthesizing the analog signal. U.S. Pat. No. 4,652,700 is yet another embodiment of a conferencing network.

SUMMARY OF THE INVENTION

A conferencing bridge provides conferencing capabilities for a plurality of input lines and for a plurality of output lines. The conferencing bridge has a signal processor which processes the audio information transferred between the input lines and the output lines. A plurality of codecs perform analog to digital conversion and digital to analog conversion for interfacing the signal processor to the plurality of input lines and output lines. A control processor is operatively connected to the signal processor and controls the operation of the signal processor as well as the conferencing bridge through number codes that are inputted to the conference bridge via the telephone key pad. A tone converter converts the inputted tones to digital information to which the control processor will respond. The signal processor provides not only identification of the telephone line on which a speaker is talking but also performs an amplitude adjustment so that there is a minimum loss involved for the conferencing network.

It is an object of this invention to provide a full duplex conferencing bridge which may be utilized with a minor modification to any existing telephone key service unit or PBX;

It is another object of the invention to provide a full duplex conferencing bridge that is microprocessor controlled and utilizes digital signal processing technology;

It is yet another object of the invention to provide a full duplex conferencing bridge having dynamic speaker selection based on speaker activity detection for smooth continuous teleconferencing;

It is yet still another object of the invention to provide a full duplex conferencing bridge having an automatic digital volume control based on speech energy contours;

It is further still another object of the invention to provide a full duplex conferencing bridge having dynamic conferencing capabilities for adding on new parties while conferencing;

It is another object of the invention to provide a full duplex conferencing bridge having remote party conference initiation capabilities in which a remote party can talk to other remote parties and/or to internal parties; and It further still another object of this invention to provide a full conferencing bridge which is transparent to the operation of the telephone system when not in use.

These and other objects and advantages of the invention will become apparent from a reading of the specification in combination with the figures in which:

BRIEF DESCRIPTION OF THE FIGURES

FIG. 1 is a block diagram of a telephony network including a digital voice conferencing bridge according to the invention having an internal party initiating conferencing calls;

FIG. 2 is a diagram illustrating a telephone key pad;

FIGS. 5A through 5E are schematic diagrams of the functional blocks of FIG. 4, to includes, FIG. 5A is the loop detector 32, FIG. 5B is the 2 wire and 4 wire converter 47, FIG. 5C is the DTMF receiver 81, FIG. 5D is the dial tone detector 85, and FIG. 5E is the ring detector 31;

DETAILED DESCRIPTION OF THE EMBODIMENTS

Figure 3:
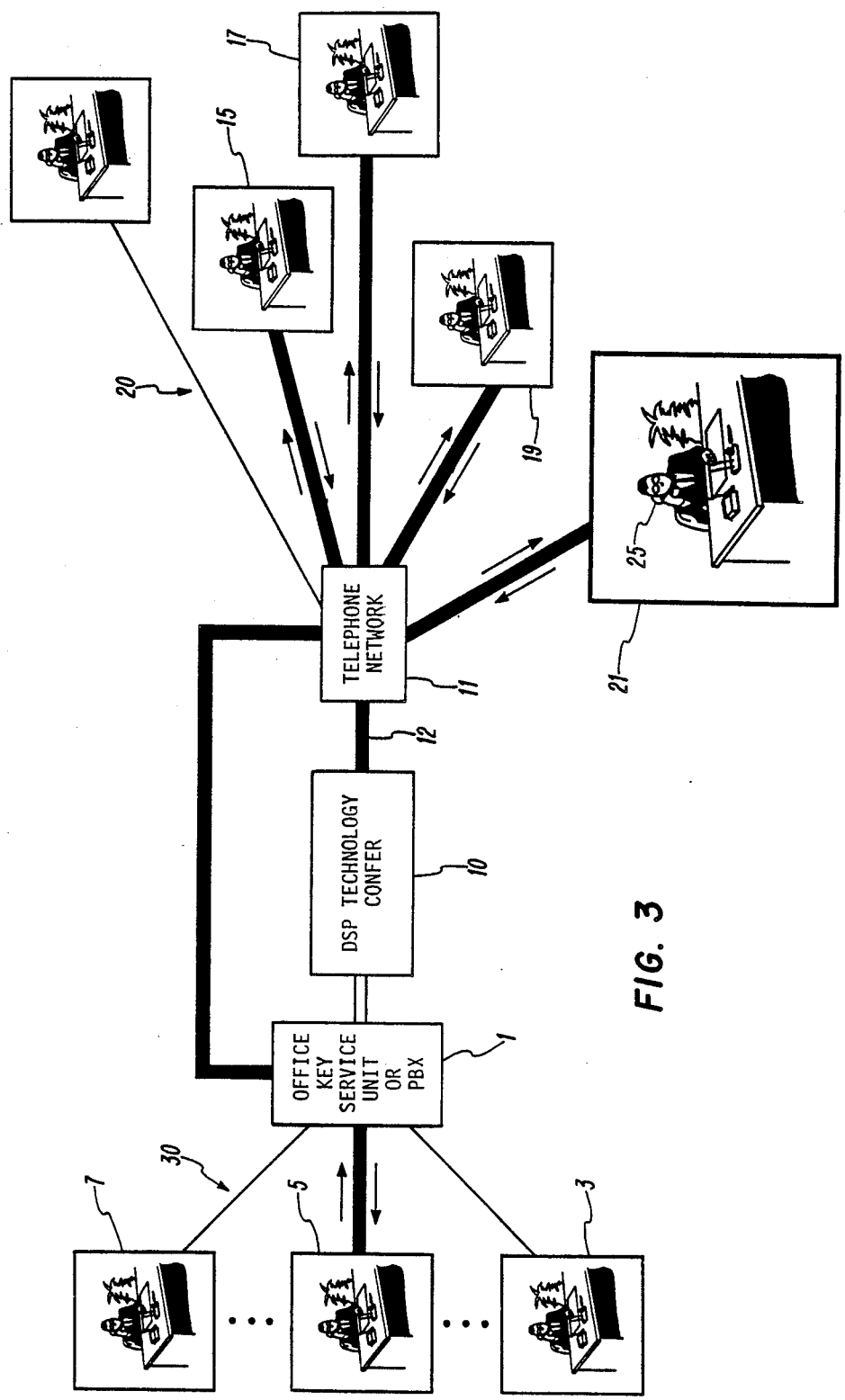
FIG. 3 is a block diagram of the telephony network including the digital voice conferencing bridge in which an external party initiates a conference.

FIG. 1, to which reference now should be made, is an embodiment of an application of a digital voice conferencing bridge 10 which is connected to an internal office telephone system 30 and an external telephone system 20. The internal office system includes an office key service unit or PBX 1 and a plurality of operators at stations 3, 5, and 7. The external telephone system includes a telephone network 11 that connects a plurality of customers 13, 15, 17, 19 and 21. Any operator at any one of the stations 3, 5 or 7 may initiate a conference call. However, for purposes of discussion, the operator at station 3 initiates the conferencing of a plurality of external users by gaining a control line through the digital voice conferencing bridge 10. This occurs when the operator at station 3 lifts the telephone receiver 23 and listens for a dial tone. When the operator at station 3 receives the dial tone it indicates that the line is available for placing a call. At the dial tone the operator at station 3 initiates the digital voice conferencing bridge 10, in the embodiment of FIG. 1, by pressing the digits 198 on a Touch Tone, a AT&T trademark that represents a Dual Tone Multifrequency signalling system key pad such as that illustrated in FIG. 2 of the telephone receiver 23. At the second occurrence of a dial tone the operator at station 3 dials the number of the first party to be connected such as the party at Block 13.

When the party at Block 13 receives the call the operator at station 3 then places that party on hold by inputting a predetermined Touch Tone digit to the digital voice conferencing bridge 10. In the embodiment shown, this Touch Tone digit is a 1. The operator at station 3, after receiving a dial tone, proceeds by dialing the second party and placing that party on hold by inputting a 1. This procedure is repeated until all the parties to be conferenced are connected to the operator at station 3 via the digital voice conferencing bridge 10. In the embodiment of FIG. 1 the number of parties that can be conferenced is 6, the operator plus 5 others. If the operator at Block 3 wishes to include other internal parties in the conference the operator can achieve this by using one of the external lines to call the internal party or use the conferencing feature of the office key service unit or PBX 1. The operator can be at any inside location in FIG. 1 and at any local in the embodiment of FIG. 3 which will be discussed below.

In the event that the operator at station 3 gets a busy signal or no one answers, then by inputting a second Touch Tone digit, such as 2 in the embodiment of FIG. 1, to the digital voice conferencing bridge 10, the busy line is disconnected and the operator at station 3 then re-initiates the conferencing by inputting the Touch Tone digit 1. After all the parties who are to be conferenced are called and placed on hold the conferencing will begin when the operator at station 3 presses a Touch Tone digit such as a 3 and the digital voice conferencing bridge 10 places the called parties in conference with the operator at station 3.

At any time the last party connected to the conferencing network 10 may be disconnected by the operator at station 3 by pressing a predefined Touch Tone digit such as a 2. Therefore, the last party to be connected, in the example of FIG. 1 the user at Block 21, is the first party to be disconnected. Additionally, one party can be disconnected and a second party added to the conference. For example, in the embodiment being discussed, if the operator at station 3 presses a Touch Tone digit 2 the party at block 21 is disconnected and then that operator can press a Touch Tone digit 1 and at the dial tone dial an alternate party such as the party at Block 5. After answering, the party at block 5 is joined to the conference after the operator presses the touch tone 3. Thus, operator at Block 3 has great flexibility in adding and deleting remote parties or internal parties such as Blocks 5 and 7 through disconnecting the parties by inputting a Touch Tone 2 into the digital conferencing bridge 10 and inputting a 1 and dialing the number of the party to be connected, such as the party at Block 7 and obtaining thereby that party to join the conference and pressing the 3 to proceed with the conference call. The inputting of the Touch Tone 1 and dialing the telephone numbers of the parties to be connected is done only after the operator receives a dial tone for each step. The only limitation is that the number of participants in the embodiments of FIGS. 1 and 3 can not exceed 6.

A remote user may also initiate a conference both to external parties that are a part of the telephone system 20 or to internal parties that are a part of the telephone system 30. This embodiment is shown in FIG. 3 to which reference should now be made. The digital voice conferencing bridge 10 is programmed for remote access by an internal operator obtaining the control line, pressing a sequence of Touch Tone codes to inform the digital voice conferencing bridge 10 that is being programmed for remote access. In the embodiment of FIG. 1 or 3 these sequences of Touch Tone codes are the Touch Tone digits 198. Any operator may obtain a control line from any station of the telephone system 20. It should be noted that the digital voice conferencing bridge 10 is programmed to accept the operator's personal identification code prior to being programmed for remote operation. This is performed by the operator entering a sequence of Touch Tone digits, 196, then the operator after receiving a confirmation sequences of defined tones, enters a selected personal identification code. After a confirmation by the digital voice conferencing bridge 10 through a sequence of defined tones that it has accepted the remote access command and operator identification, the digital voice conferencing bridge 10 is then available for a remotely called conference.

It is sometimes desirable and often preferable not to leave the digital voice conferencing bridge 10 in the remote access mode. The digital voice conferencing bridge 10 is removed from the remote access mode by obtaining the control line inputting a deprogramming code which in the embodiment of FIG. 1 or 3 is the Touch Tone digits, 197, and hanging up. Once the digital conferencing bridge 10 is placed in the remote mode, then a remote access may be made to initiate a conference call. In this mode, the control line is one of the input lines to the voice conferencing bridge 10 from the telephone network 11 which has a number of lines equal to the number of remote or conferencing parties. In the embodiment of FIG. 3 this number is 5, and therefore there are 5 pairs of telephone lines connected between the telephone network 11 and the digital voice conferencing bridge 10 via a trunk bundle 12. One set of lines of the trunk bundle 12 is assigned a remote number and is the control line. To establish a remotely initiated conference the operator at Block 21 lifts the receiver 25 and inputs the telephone number of the assigned control line that is part of the trunk bundle 12. Once the digital voice conferencing bridge 10 detects the call from the operator at station 21, it will provide a confirmation tone back to the operator at station 21. The operator at station 21 will then input his personal identification code which is a preassigned and changeable four digit Touch Tone code. The digital voice conferencing bridge 10 then verifies that the inputted code is valid and if that verification is made the operator at station 21 is then provided a dial tone.

Once the operator at station 21 has received the dial tone, then through the use of the codes 1, 2, and/or 3 that operator can initiate conferencing or terminate conferencing as was discussed in connection with FIG. 1. It should be noted that the digital voice conferencing bridge 10 is under the control of the user who has the control line. The operator at station 21 places a call by the telephone network 20 directly into the operator at station 5 and also through the digital voice conference bridge 10 and the telephone network 20 to the operators at station 15, 17, and 19.

Figure 4:
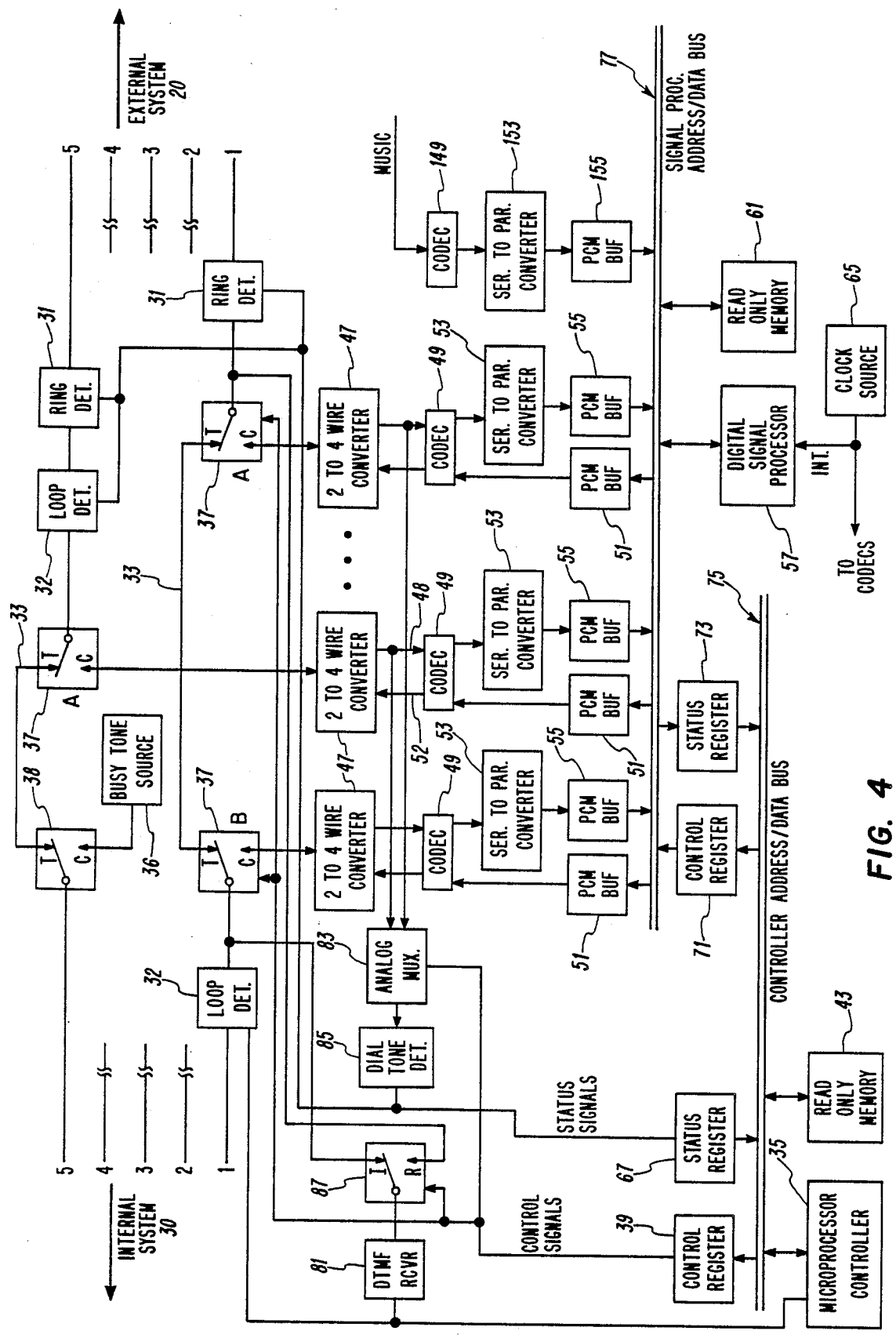
FIG. 4 is a simplified block diagram of the digital voice conferencing bridge of FIGS. 1 and 3.
Figure 5B:
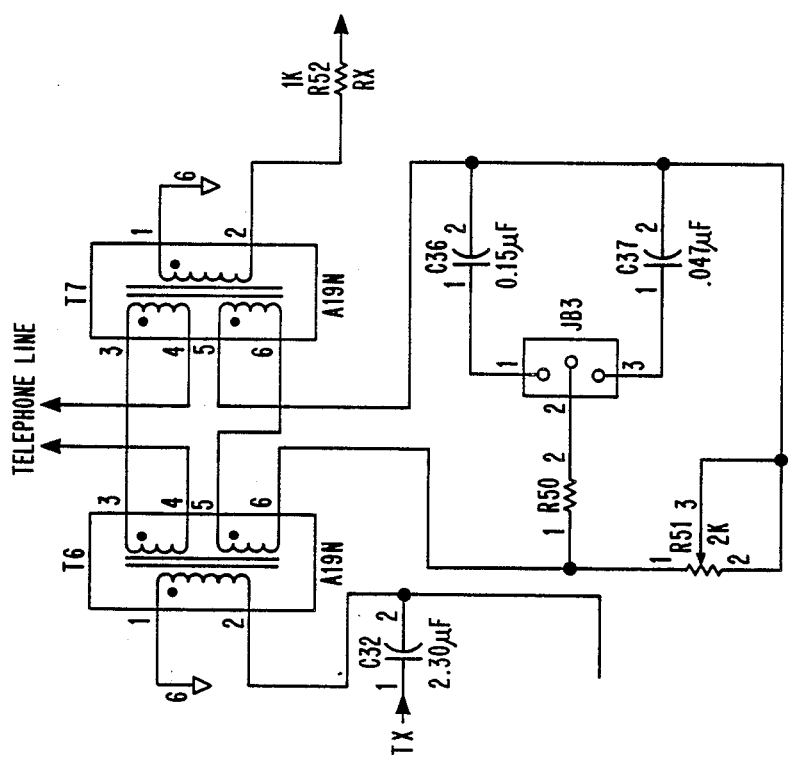
Figure 5A:
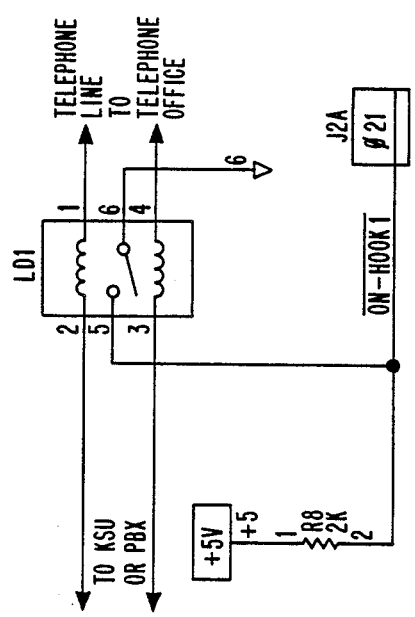
Figure 5E:
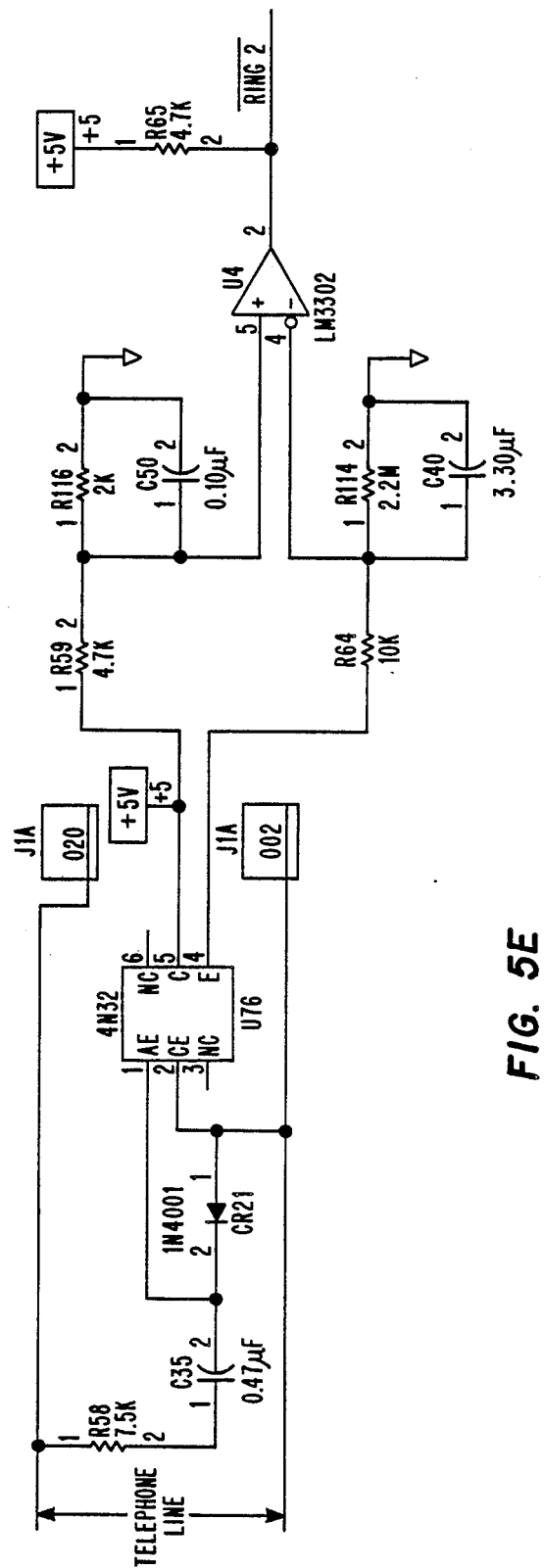

FIG. 4 is a block diagram of the digital voice conferencing bridge 10 of FIGS. 1 and 3 whereas FIGS. 5 are schematic diagrams showing the implementations of some of the blocks of FIG. 4.

In the embodiment of FIG. 4 there are five telephone lines connecting the digital voice conferencing bridge 10 to the external system 20 and 5 telephone lines connecting the internal system 30 to the digital voice conferencing bridge 10. Most telephone systems provide two wire services so each line represents a telephone line pair.

Each of the telephone lines, line 1 through 5, that is brought into the digital voice conferencing bridge 10 is connected to a ring detector 31 and a loop detector 32. Each ring detector 31 detects rings on the line to which it is connected and each loop detector 32 detects when a receiver of the telephone set that is connected to an associated line is lifted off the cradle.

A switching network 33 includes an A switch and a B switch. The switching network 33 enables the digital voice conferencing bridge 10 to be transparent to the internal system 30 and the external system 20 when not in the conferencing mode of operation.

Relay 87 is connected to the internal and external sides of the switching network 33 of the telephone line that is to be used as the control line. In the case of FIG. 1, the control line is line 1 of the internal system 30 and also the external system 20. Each telephone line of external system 20 has similar circuits connected to it as line 1 of internal system 30 so the discussion when directed to the circuits connected to line 1 is equally applicable to the other connecting circuits. Control line 1 is obtained by an operator inputting the designated Touch Tones which are decoded by the dual tone multiple frequency (DTMF) receiver 81. The DTMF receiver 81 converts the Touch Tone codes into digital data for application to a microprocessor controller 35. The microprocessor controller 35 generates control signals in response to the decoded digital data that switches relay 37A and relay 37B from the T terminals to the C terminals. The control signals are provided via the control register 39, the read only memory 43 and the microprossesor controller 35.

A two wire to four wire converter 47 converts the two wires from the relay 37 to four wire full duplex operation for input to a codec 49. The codec 49 provides analog to digital conversion for the analog signals as applied thereto via conductor 48 and converts digital signals provided from the buffer 51 to the codec 49 to analog signals for application to the relay 37 via conductor 52.

The digital output of the codec 49 is a serial output and it is converted to a parallel data via the serial to parallel converter 53 and stored in a buffer 55 for processing by the digital signal processor 57. Additionally each telephone line of external system 20 is connected to a conferencing circuit that includes a relay 37A, a two line to four wire converter 47, a codec 49, a buffer 51, a serial to parallel converter 53 and an input buffer 55. The remaining four lines of internal system 30 is connected to a relay 38 which in conference mode directs these lines to a busy tone signal at Block 36. The microprocessor controller 35 additionally initializes the digital signal processor 57 and monitors this operation via a control register 71 which connects the data bus 75 and the microprocessor controller 35 to the data bus 77 and the digital signal processor 57. Status is obtained by a status register 73 which connects the data bus 77 to the data bus 75.

Ring detectors 31 on each line provide status to status register 67 and data to a DTMF receiver 81. Status register 67 also obtain status from the loop detector 32. Connected to the two wire to four wire converters is an analog mux 83 which monitors the inputs to each codec 49 and sequentially under the control of the control signals provided via the control register 39 under the control of the microprocessor controller 35, applies the input line to a dial tone detector 85 for detecting of a dial tone on the monitored line and provides this status to the status register 67.

Relay 87 is the control line relay and when connected to I, the digital voice conferencing bridge 10 is in the internal mode and when connected to R, the digital voice conferencing bridge 10 is in the remote mode.

Codec 149, serial to parallel to converter 153 and buffer 155 receive a music input and converts that input to digital information for applying to the conferencing parties during the hold periods via the digital signal processor 57. The hold period is usually the period of time when the initiator has one party on hold and is connecting the other parties who are to be conferenced and thus is defined as a period of time between when one party picks up the phone and the initiator hits a 3 to initiate conference as was discussed in conjunction with FIGS. 1 and 3.

The programs for the microprocessor controller 35 is stored in the read only memory 43 whereas the programs for the digital signal processor 57 is stored in the read only memory 61. Timing for the operation of the circuits is provided by a clock 65. It should be noted that the digital signal processor 57 is a device such as a TMS 32010 digital signal processor that is manufactured by Texas instruments incorporated of Dallas, Tex.

FIGS. 5A to 5E are schematic diagrams of the individual circuit blocks of FIG. 4 and because of use of standard circuit components will not be discussed.

Figure 6A:
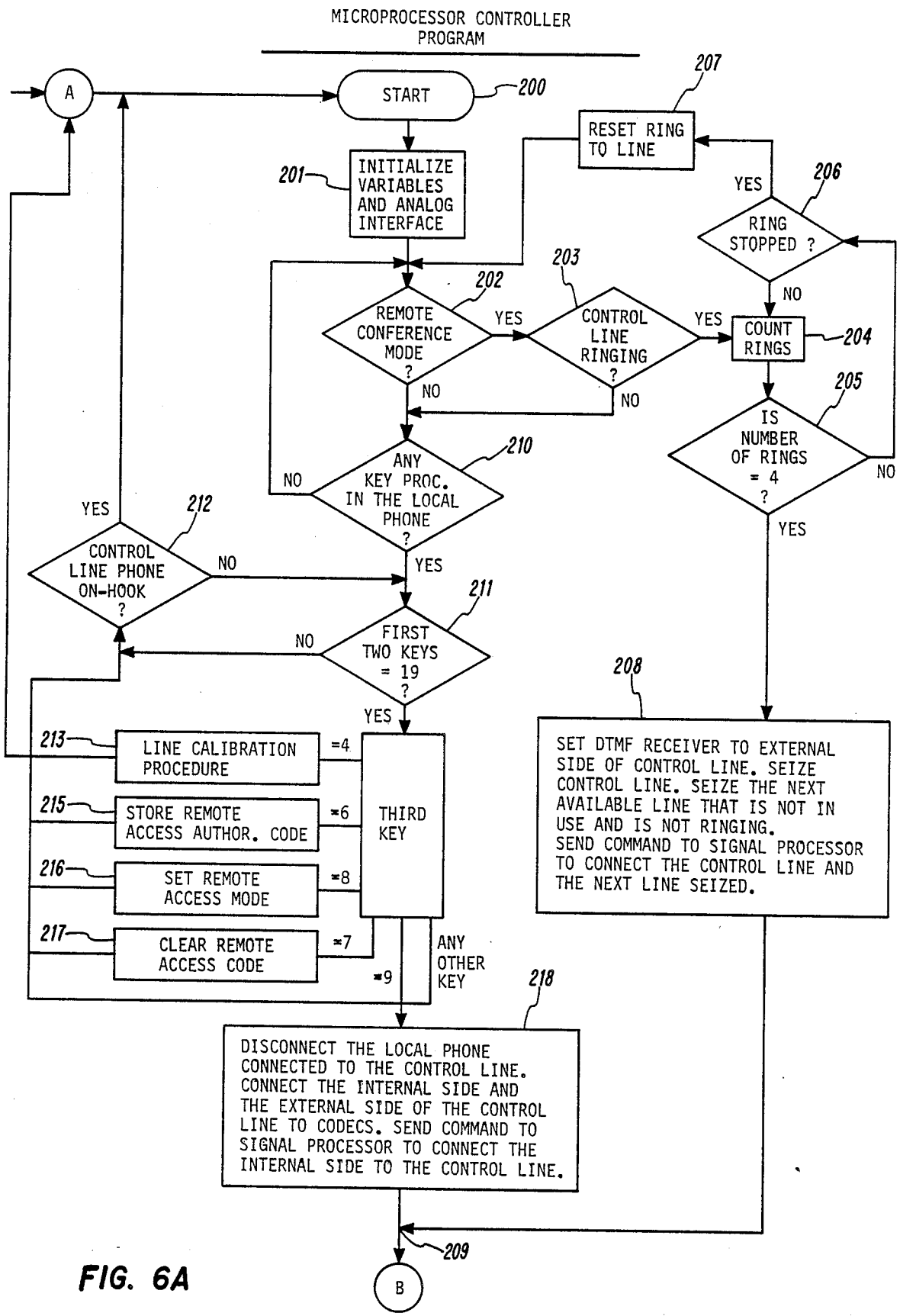
FIGS. 6A, 6B, and 6C are flow diagrams of the program stored in the read only memory 43.
Figure 6B:
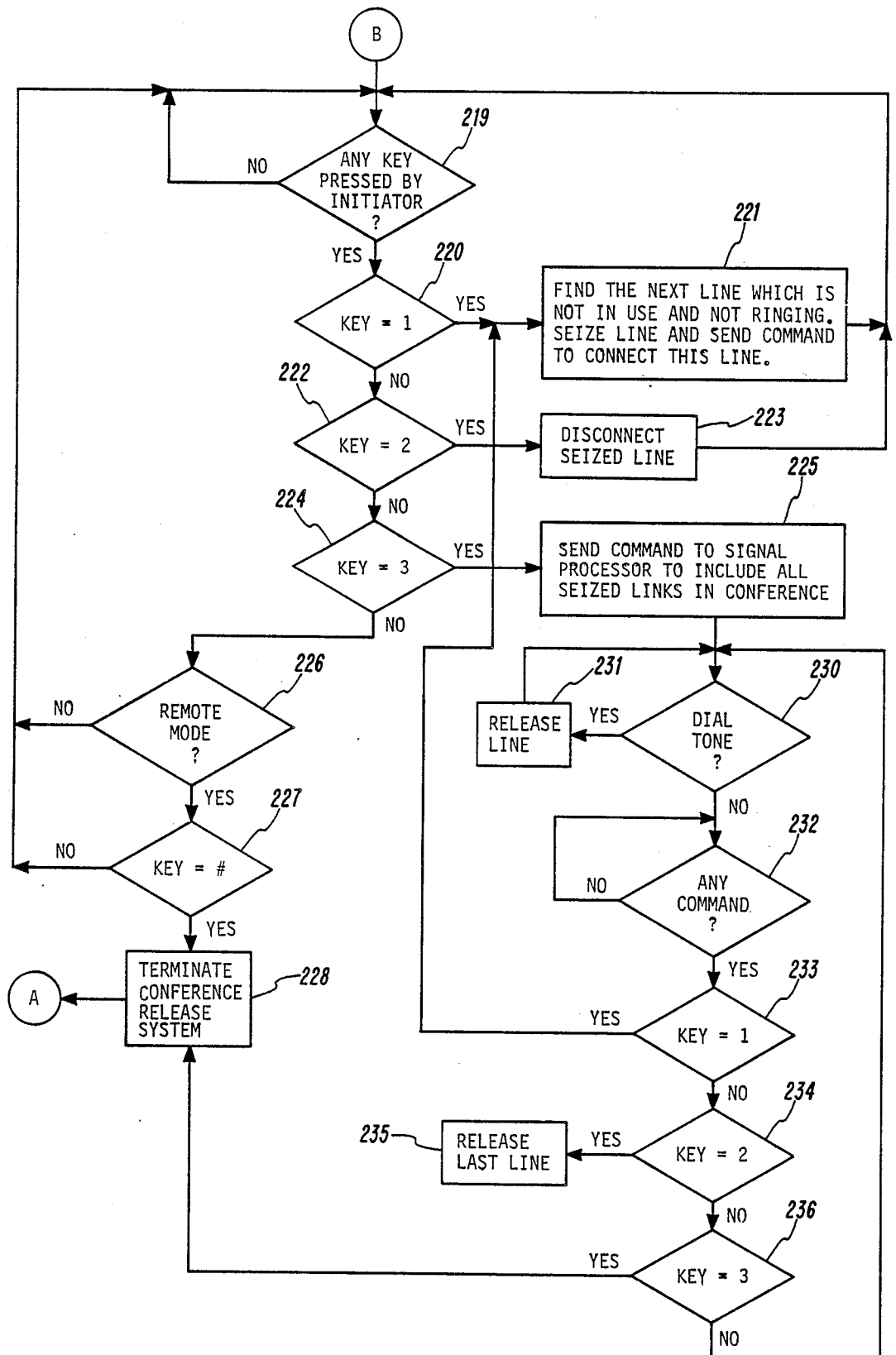
Figure 6C:
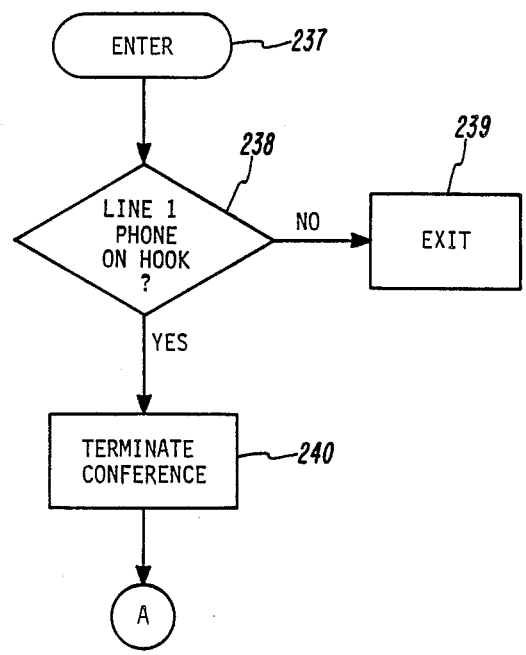
Figure 6D:
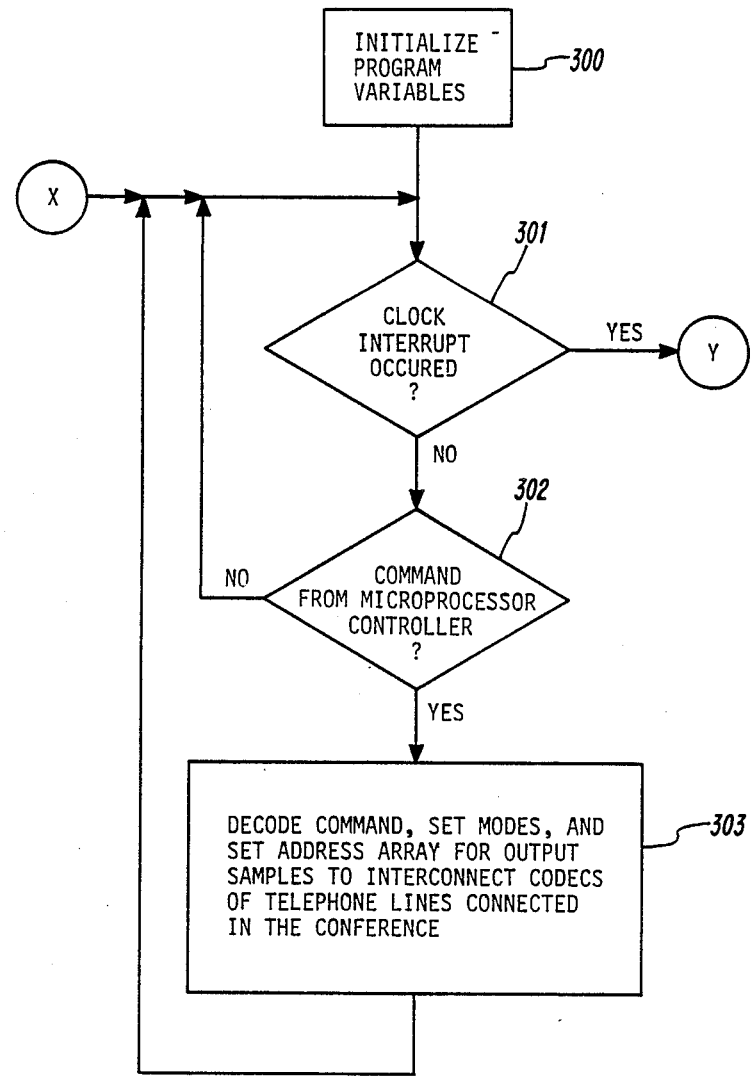
FIGS. 6D, 6E and 6F are flow diagrams of the programs stored in the read only memory 61.
Figure 6E:
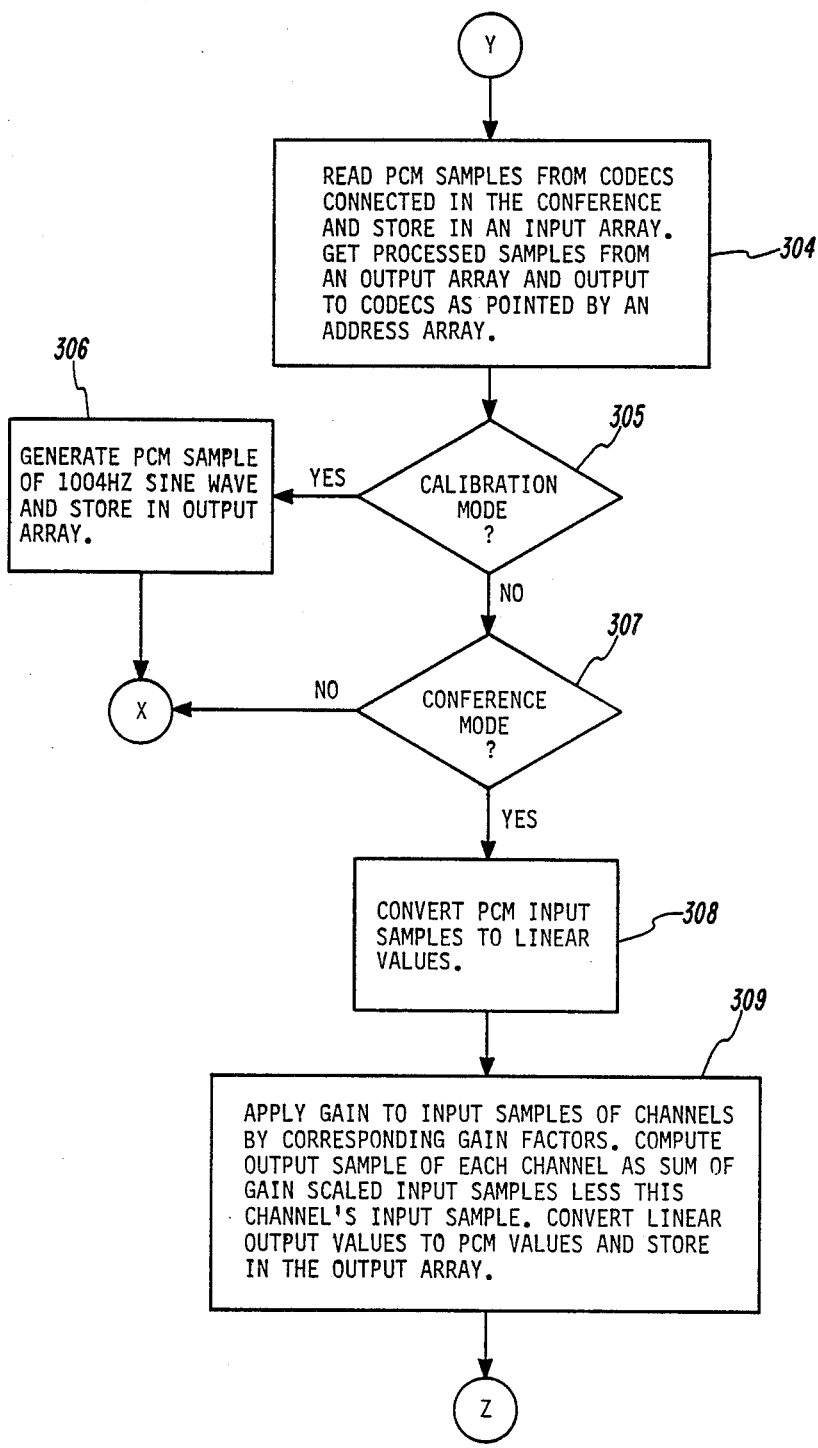
Figure 6F:
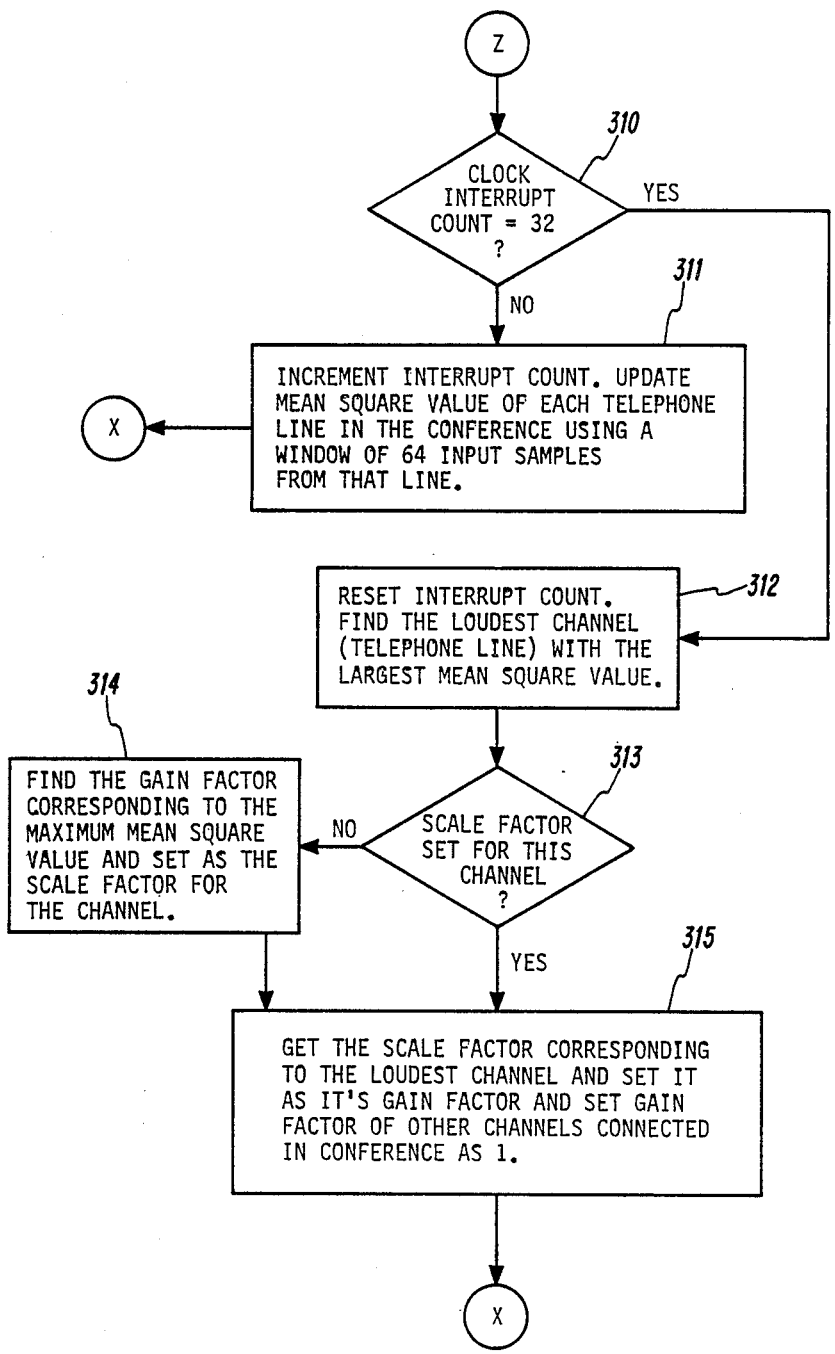

FIGS. 6A, 6B, and 6C are flow diagrams of the programs stored in the read only memory 43 whereas the programs stored in the read only memory 61 are represented by FIGS. 6D and 6E.

FIG. 6A, at block 201 the microprocessor is initialized. The switching network system 33 is initialized and the digital voice conferencing bridge 10 is transparent to the external system 20 and internal system 30. Block 202 indicates the digital voice conferencing bridge 10 has been programmed for the remote conferencing mode.

REMOTE MODE OF OPERATION

The digital voice conferencing bridge 10 monitors at block 203 to see if the ring detector 31 at line 5 has detected any rings. If it has detected rings then the rings are counted at block 204 and it counts until the number of rings has reached a preselected number at block 205. This preselected number in block 205 is four. As long as it rings up through four, then the digital conferencing bridge 10 at block 206 ascertains if the rings have stopped; if they haven't stopped then the counting is initialized. If the rings have stopped, then the ring counter within the microprocessor controller 35 is reset at block 207. Returning to block 205, where the number of rings equals 4 then at block 208 the control line is seized and the next available line that is not in use and is not ringing is also seized. This command is given to the microprocessor controller 35 to connect the control line to the next seized line so that the remote operator such as operator 21 of FIG. 3 may dial up the next party to be called. After block 208, the unit returns to node 209 to proceed with the conferencing procedure.

INTERNAL MODE OF OPERATION

Returning to block 202 when the microprocessor controller 35 is not in the remote conferencing mode, it sits and monitors the DTMF receiver 81 to see if any keys have been pressed in any local telephones at block 210; if any keys have been pressed, it ascertains if the first two keys are 19 at block 211. If the first two keys do not equal the numbers 19, then the system checks to see if the telephone that is part of the internal system 30 is connected to line 1 and if so, if it is on hook at block 212. If the telephone is on the hook, the digital voice conferencing bridge 10 returns to block 201. If the telephone is not on the hook, the unit returns to monitor the output from the DTMF receiver 81 to detect when the first two keys equal to 19 at block 212.

There are preassigned keys to the 19 sequence. If the third key is equal to 4, a line calibration procedure is initialized at block 213. If the third key is equal to 6, the procedure for storing remote access code is performed at block 215. At block 216, if the third key is an 8 then the remote access mode is set. If the third key is a 7 at block 217, then the remote access mode is disabled. When the third key is a 9 at block 218, relays 37A and 37B are connected to the 2 wire to 4 wire converters 47 and after which the system returns to block 209.

FIG. 6B shows at connect B and decision block 219 the voice conferencing bridge 10 ascertaining if any keys have been pressed by the operator who has initiated the conference call, and if so, checks to see if the key equals 1 at block 220. When the pressed key equals 1, the next line that is not in use and not ringing is seized and a command is then sent to energize the relay system 37 of that line at block 221. If the pressed key does not equal a 1, then at block 222 a check is made to see if it is equal to 2. When equal to 2 the seized line is disconnected at block 223. Disconnect means to deenergize the relay 37A and 37B that are part of the switching network 33 for the appropriate line.

If the key is equal to 3 at block 224, a command is sent to the microprocessor controller 35 to include all seized lines in conference at block 225. If no check is made at block 226 to check if the unit is in the remote access mode, the unit returns to point B. If the digital voice conferencing bridge 10 is in the remote access mode, the microprocessor controller ascertains if the inputted key is the pound symbol at block 227 and, if so, the conference call is terminated at block 228 and the system returns to point A. If not, the conferenced continues.

After the command is sent through the microprocessor controller 35 at block 225, it is ascertained if a dial tone is present at decision block 230. When a dial tone is present the the microprocessor controller 35 indicates that the called party has hung up and the line is released at block 231. If no dial tone is present, then a check is made to ascertain if any command is present in block 232 and the microprocessor controller waits until a command is received. When received, a check is made to see if the pressed key is equal to 1 at block 233 and, if so, the unit proceeds to block 221. If the command is not a 1, a check is made to see if the command key is equal to 2 at block 234 and, if so, the line is released at block 235. When the command is not a 1 or a 2 but is equal to 3 in block 236, the conference system is released at block 228. If the command was not a 1, 2 or 3 key a check is made to see if a dial tone is present at block 230.

There is always a little subprogram being executed by the microprocessor controller 35 which is shown in FIG. 6C. At block 237 the microprocessor 35 enters the program. Then a check is made if the phone that is connected to the line 1 in the internal system 30 is off the hook and this is done in block 238. If the phone is off the hook, then the system exits at block 239. When a conference has been initiated and the phone is back on the hook, then at block 240 the conference is terminated. This allows the initiator to terminate the conference by simply hanging up the phone.

The digital signal processor performs the following functions: it detects which party in the conference is talking, adjusts the level of that party's voice, and connects the speaker to other parties in the conference. The program initializes the digital signal processor at block 300 of FIG. 6D. A check is made at block 301 if the digital signal processor has been interrupted by an 8 khz clock. If there is no interrupt, the program then checks at block 302 if there is a command from the microprocessor controller at the control register 71. If there is no command, program returns to block 301. If there is a command, then the program decodes the command at block 303, gets the channel numbers of the codecs 49 associated with the telephone lines that have been connected to the conference, and sets the address array of the output samples to point to appropriate channel numbers. The program then returns to block 301.

If an interrupt has been detected at block 301, the program enters the interrupt routine at connect point Y. At block 304, the program reads the Pulse Code Moulated (PCM) input samples from the code is connected in the conference, obtains processed output PCM samples pointed by the output address array and outputs to the corresponding codecs. Then at block 305, a check is made if the program is in calibration mode. If it is yes, PCM sample of a 1004 HZ sine wave used as a calibration tone is stored in the output array. Then the control returns to block 301 at connection point X. If the answer is no at block 305, then the program checks if it is conference mode. If it is no, the control returns to block 301 at connection point X. If it is yes, then the program converts the PCM input samples to linear values by using a table look-up procedure. Then it applies gain to the input samples of channels or telphone lines connected in the conference by multiplying them with the corresponding gain factor, computes the output sample to each channel as the sum of the gained input samples minus the input sample from that channel and stores the result in the output array. This procedure, in effect, interconnects all the parties in the conference. After execution of block 309, a check is made at block 310 if the clock interrupt count is 32. If the answer is no, then at block 311, the program increments the interrupt count by one, updates the mean square value of each channel in the conference that represents the speech energy contour of the speaker associated with this channel. This mean square value or speech energy contour computation uses a window of 64 input samples from each channel. The program then returns to block 301 at connection point X. If the interrupt count check is ascertained at block 310, the program then at block 312 resets the interrupt count, finds the loudest speaker by testing all the mean square values of the parties in the conference and finding the channel into the largest means square value. Then at block 313, a check is made if scale factor has been set for the detected loudest channel. If it is no, then the gain factor corresponding to the maximum mean square value of the channel is found by a table look-up procedure and this factor is set as the scale factor for that channel. This process, in effect, adjusts the voice level of the speaker. The program then proceeds to block 315. If the scale factor has been found to be already set at block 313, the program continues to block 315. At block 315, the scale factor of the current loudest channel is set as the gain factor for the channel associated with the loudest speaker and the gain factors of other channels in the conference are set as unity. Then the program returns to block 301 at connection point X.

Although the description of the embodiments of the mentioned have been described with certain detail to accuracy it is obvious that changes may be made to the embodiments of the invention without departing from the scope thereof. Accordingly the scope to promote the progress and science and useful arts I claim the following invention.

I claim:

1. A digital voice conferencing bridge comprising: a first plurality of telephone line terminals;
    a second plurality of telephone line terminals;
    a first plurality of dual position relay contacts with each single contact being connected to a single telephone line terminal of the first plurality of telephone line terminals;
    a second plurality of dual position relay contacts with each single relay contact being connected to a single telephone line terminal of the second plurality of telephone line terminals, each single member of the first plurality of the dual position relay contact being connected to a single member of the second plurality of relay contacts when the first and second plurality of relay contacts are in a first position;
    a signal processor including a means for detecting a loudest telephone line based on the mean squared value of the audio energy on the telephone line;
    a plurality of codecs connected between the first plurality of dual position relay contacts and the signal processor whereby each single telephone line terminal of the first plurality is connected to a single codec via a predetermined relay contact of the first plurality of relays contacts when the predetermined relay contact is in a second position of the dual positions;
    a control processor operatively connected to the signal processor; and
    an internal circuit connected between the signal processor and a preselected telephone line terminal of the second plurality of telephone line terminals via a preselected relay contact of the second plurality of relay contacts when the preselected contact is in a second position of the dual position.

2. The digital voice conferencing bridge according to claim 1 further comprising:
    a tone converter operatively connected between the control processor and each single telephone line terminal of the predetermined member of the first plurality of relay contacts.

3. The digital voice conferencing bridge according to claim 1 further comprising:
    a plurality of ring detectors operatively connected such (as) that each single telephone line terminal of the first plurality of telephone line terminals has a ring detector connected thereto, the plurality of ring detectors being operatively connected to the control processor.

4. The digital voice conferencing bridge according to claim 1 further comprising:
    a dial tone detector operatively connected to detect dial tones on each of the first plurality of telephone line terminals.

5. The conferencing bridge according to claim 4 the dial tone detector further includes:
    a multiplexer operatively connected between each single telephone line terminal of the first plurality of telephone line terminals and the dial tone detector.

6. A digital voice conferencing bridge comprising:
    a first means for connecting a first plurality of telephone lines to the digital voice conferencing bridge;
    a second means for connecting the digital voice conferencing bridge to a second plurality of telephone lines;
    a signal processor means for processing signals applied thereto and includes a means for detecting a loudest telephone line based on the mean squared value of the audio energy on the telephone line;
    a plurality of codec means for converting analog signals to digital signals when applied to a first input and for converting the digital signals to analog signals when applied to a second input, said plurality of codec means being operatively connected to signal processor means;
    switch means for selectively switching predetermined members of the first and second means to preselected members of the plurality of codec means; and
    a control processor means for controlling the operation of the switch means and signal processor means.

7. The digital voice conferencing bridge according to claim 6 further comprising:
    a tone converter means operatively connected between the control processor means and the first and second means for converting tones applied thereto to digital data.

8. The digital voice conferencing bridge according to claim 6 further comprising:
    ring detector means for detecting a telephone ring, the ring detector means being operatively connected to the first means and to pass an indication of a detected ring to the control processor means.

9. The digital voice conferencing bridge according to claim 6 further comprising:
    means for adjusting the signal gain of each signal applied to the signal processor means.

10. A method of voice conferencing comprising:
    connecting a first plurality of telephone lines to a digital voice conferencing bridge with a first means;
    connecting the digital voice conferencing bridge to a second plurality of telephone lines with a second means;
    processing signals applied with a signal processor means, including the step of adjusting the signal gain of each signal applied to the signal processor means;
    converting analog signals to digital signals with a plurality of codec means when applied to a first input and for converting digital signals to analog signals when applied to a second input, said plurality of codec means being operatively connected to the signal processor means;
    selectively switching predetermined members of the first and second means to preselected members of the plurality of codec means with a switch means; and
    controlling the operation of the switch means and signal processor means with a control processor means.

11. The method according to claim 10 further comprising:
   converting tones applied to preselected members of the first and second plurality of telephone lines to digital data.

12. The method according to claim 10 further comprising:
   detecting a telephone ring with a ring detector means operatively connected to the first and second plurality of telephone lines and passing an indicator of a detected ring to the control processor means.

13. The method according to claim 10 further comprising the step of:
   detecting a loudest telephone line based on the mean squared value of the audio energy on the telephone line.

* * * * *